UNITED STATES PATENT OFFICE.

GEORGE WASHINGTON HENRY, OF CHEROKEE, IOWA, ASSIGNOR OF ONE-HALF TO RODNEY L. ROBIE, OF SAME PLACE.

COMPOSITION BLACKBOARD.

SPECIFICATION forming part of Letters Patent No. 453,388, dated June 2, 1891.

Application filed October 14, 1890. Serial No. 368,087. (No specimens.)

*To all whom it may concern:*

Be it known that I, GEORGE WASHINGTON HENRY, a citizen of the United States, residing at Cherokee, in the county of Cherokee and State of Iowa, have invented a new and useful Improvement in Composition Blackboards for Use in Schools, &c., of which the following is a specification.

My composition consists of the following ingredients, combined in the proportions stated, viz: fine sand, twenty pounds; stucco, fifteen pounds; slaked lime, (putty,) five pounds; Portland cement, one pound; lamp-black, one pound; black antimony, one-half pound; marble-dust, one pound; emery-dust, one ounce; white glue, one ounce; plastering-hair, one ounce; water sufficient to mix. These materials, suitably mixed, are applied to any surface where a blackboard is desired, similarly to ordinary plastering, being usually put, however, upon a suitable backing of about one-half-inch thickness of plastering composed of four parts of sand to one part of stucco, sufficient to make a solid back for the blackboard finish; or the complete boards may be made in sections of any desired shape or size and attached to the walls by screws or other suitable fastenings.

The following-mentioned of above ingredients can also be put up in compact form for shipment to place of use, viz: slaked lime, lamp-black, emery-dust, marble-dust, and black antimony, and the boards completed by the addition of the other materials at the place of using.

This board combines ease of manufacture, durability far exceeding that of boards in common use, readiness of cleaning, and perfect adaptation to its intended use. It presents a smooth compact surface and one upon which the chalk or crayon readily takes hold and upon which the marks are easily seen.

Having thus described my invention, what I claim as new is—

1. The herein-described composition of materials, consisting of sand, stucco, slaked lime, cement, lamp-black, hair, black antimony, glue, marble-dust, emery-dust, and water, in the proportions stated, for use as a blackboard, with or without the backing, substantially as above.

2. The completed boards, made at a factory or other place and set up where required, substantially as above set forth.

GEORGE WASHINGTON HENRY.

Witnesses:
A. R. MOLYNEUX,
R. L. ROBIE.